United States Patent
Andersen et al.

(10) Patent No.: US 8,307,956 B2
(45) Date of Patent: Nov. 13, 2012

(54) WHEEL CHOCK SYSTEM

(75) Inventors: Jonathan Andersen, Grafton, WI (US); Eric Bublitz, Milwaukee, WI (US); Timothy Cotton, Milwaukee, WI (US); John A. Kish, Grafton, WI (US); Kurt Lessard, S Milwaukee, WI (US); Timothy Muhl, Slinger, WI (US); Kyle E. Nelson, Cedarburg, WI (US); Pamela Pietrangelo, Oak Creek, WI (US); Reinhard E. Sander, Wauwatosa, WI (US); Matt Sveum, Wauwatosa, WI (US); Benjamin Wieberdink, Cedar Grove, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 958 days.

(21) Appl. No.: 11/828,039

(22) Filed: Jul. 25, 2007

(65) Prior Publication Data
US 2009/0026022 A1    Jan. 29, 2009

(51) Int. Cl.
*B61H 13/00* (2006.01)
(52) U.S. Cl. .......................... 188/36; 188/4 R
(58) Field of Classification Search ............ 188/32, 188/4 R, 36; 410/30, 7, 9, 19, 49, 52; 414/396, 414/401, 426, 429
See application file for complete search history.

(56) References Cited

U.S. PATENT DOCUMENTS

| 1,102,773 | A | 7/1914 | Martin |
| 2,413,744 | A | 1/1947 | Carter |
| 2,773,564 | A | 12/1956 | Garard, Sr. |
| 2,858,905 | A | 11/1958 | Fahland |
| 3,110,466 | A | 11/1963 | O'Sullivan |
| 3,221,907 | A | 12/1965 | O'Sullivan |
| 3,305,049 | A | 2/1967 | Willey |
| 3,447,639 | A | 6/1969 | Parr |
| 3,542,157 | A | 11/1970 | Noah |
| 3,666,118 | A | 5/1972 | Raynes et al. |
| 3,667,160 | A | 6/1972 | Salloum |

(Continued)

FOREIGN PATENT DOCUMENTS

CA    1308222    10/1992

(Continued)

OTHER PUBLICATIONS

International Searching Authority, "PCT International Search Report," issued in connection with counterpart PCT application No. PCT/US2008/065855, mailed on Dec. 3, 2008, 4 pages.

(Continued)

*Primary Examiner* — Xuan Lan Nguyen
(74) *Attorney, Agent, or Firm* — Hanley, Flight & Zimmerman, LLC

(57) ABSTRACT

A wheel restraint for restraining a vehicle at a loading dock includes various features such as, a wheel chock supported by a spring loaded articulated arm with a spring that can be selectively tightened or released, a sensor that detects whether the chock is solidly against a base plate or floor, a bi-directional pivotal joint between the articulated arm and the wheel chock to ensure that the chock can sit squarely on a mating base plate, a wheel chock that meshes with a hydraulically actuated base plate, pivotal or otherwise movable backstops that prevent a wheel chock from sliding out of position, and a base plate cleaning system. The cleaning system might include a vehicle-actuated brush, fluid spray nozzles, electric heater and removable cover plates.

12 Claims, 8 Drawing Sheets

U.S. PATENT DOCUMENTS

| | | | |
|---|---|---|---|
| 3,797,410 | A | 3/1974 | Blunden |
| 4,013,145 | A | 3/1977 | Mumm |
| 4,024,820 | A | 5/1977 | Hlinsky et al. |
| 4,122,629 | A | 10/1978 | Rennick |
| 4,146,888 | A | 3/1979 | Grunewald et al. |
| 4,191,503 | A | 3/1980 | Neff et al. |
| 4,207,019 | A | 6/1980 | Cone |
| 4,208,161 | A | 6/1980 | Hipp et al. |
| 4,216,724 | A | 8/1980 | Grillet |
| 4,264,259 | A | 4/1981 | Hipp |
| 4,267,748 | A | 5/1981 | Grunewald et al. |
| 4,282,621 | A | 8/1981 | Anthony et al. |
| 4,373,847 | A | 2/1983 | Hipp et al. |
| 4,379,354 | A | 4/1983 | Hahn et al. |
| 4,443,150 | A | 4/1984 | Hahn et al. |
| 4,472,099 | A | 9/1984 | Hahn et al. |
| 4,560,315 | A | 12/1985 | Hahn |
| 4,572,080 | A | 2/1986 | Williams et al. |
| 4,605,353 | A | 8/1986 | Hahn et al. |
| 4,634,334 | A | 1/1987 | Hahn et al. |
| 4,653,967 | A | 3/1987 | Isaksson et al. |
| 4,674,929 | A | 6/1987 | Blunden |
| 4,674,941 | A | 6/1987 | Hageman |
| 4,676,344 | A | 6/1987 | Locicero |
| 4,679,974 | A | 7/1987 | Blunden |
| 4,695,216 | A | 9/1987 | Erlandsson |
| 4,728,242 | A | 3/1988 | Erlandsson |
| 4,759,678 | A | 7/1988 | Hageman |
| 4,765,792 | A | 8/1988 | Cherry et al. |
| 4,767,254 | A | 8/1988 | Kovach et al. |
| 4,784,567 | A | 11/1988 | Hageman et al. |
| 4,815,918 | A | 3/1989 | Bennett et al. |
| RE32,968 | E | 6/1989 | Hahn |
| 4,854,790 | A | 8/1989 | Andre |
| 4,861,217 | A | 8/1989 | Erlandsson |
| 4,865,508 | A | 9/1989 | Carlson |
| RE33,154 | E | 1/1990 | Hahn et al. |
| 4,915,568 | A | 4/1990 | West |
| RE33,242 | E | 6/1990 | Hipp et al. |
| 4,938,647 | A | 7/1990 | Erlandsson |
| 4,963,068 | A | 10/1990 | Gelder |
| 4,969,792 | A | 11/1990 | Ellis et al. |
| 4,973,213 | A | 11/1990 | Erlandsson |
| 4,979,856 | A | 12/1990 | Blunden et al. |
| 5,037,255 | A | 8/1991 | Bullock et al. |
| 5,096,021 | A | 3/1992 | Tart |
| 5,249,905 | A | 10/1993 | Warner et al. |
| 5,302,063 | A | 4/1994 | Winsor |
| 5,375,965 | A | 12/1994 | Springer et al. |
| 5,464,076 | A | 11/1995 | Benedetto, Jr. |
| 5,531,557 | A | 7/1996 | Springer |
| 5,547,045 | A | 8/1996 | Stutzman |
| 5,582,498 | A | 12/1996 | Springer et al. |
| 5,655,631 | A | 8/1997 | Richardson |
| 5,685,397 | A | 11/1997 | Maddox et al. |
| 5,689,981 | A | 11/1997 | DeLuca et al. |
| 5,692,402 | A | 12/1997 | Clements |
| 5,709,518 | A | 1/1998 | Alexander et al. |
| 5,711,110 | A | 1/1998 | Williams |
| 5,743,697 | A | 4/1998 | Alexander |
| 5,762,459 | A | 6/1998 | Springer et al. |
| 5,896,957 | A | 4/1999 | Berends et al. |
| 5,908,274 | A | 6/1999 | Silberman |
| 5,934,857 | A | 8/1999 | Alexander |
| 6,082,952 | A | 7/2000 | Alexander |
| 6,092,970 | A | 7/2000 | Hahn et al. |
| 6,123,496 | A | 9/2000 | Alexander |
| 6,199,668 | B1 | 3/2001 | Gorza et al. |
| 6,238,163 | B1 | 5/2001 | Springer et al. |
| 6,250,432 | B1 | 6/2001 | Hageman et al. |
| 6,276,496 | B1 | 8/2001 | Hageman et al. |
| RE37,570 | E | 3/2002 | Springer et al. |
| 6,357,987 | B1 | 3/2002 | Palus |
| 6,371,253 | B1 | 4/2002 | Berends et al. |
| 6,505,713 | B1 | 1/2003 | Paul et al. |
| 7,032,720 | B2 * | 4/2006 | Jette et al. ............ 188/36 |
| 7,264,092 | B2 | 9/2007 | Jette |
| 2006/0051196 | A1 | 3/2006 | McDonald |
| 2009/0223764 | A1 | 9/2009 | Andersen et al. |
| 2010/0260586 | A1 | 10/2010 | Manone et al. |

FOREIGN PATENT DOCUMENTS

| | | |
|---|---|---|
| CA | 2164737 | 6/1997 |
| CA | 2164738 | 6/1997 |
| CA | 2419680 | 8/2003 |
| DE | 583404 | 9/1933 |
| DE | 2735826 | 2/1979 |
| DE | 205852 | 1/1984 |
| DE | 3830891 | 3/1990 |
| DE | 4120035 | 12/1992 |
| DE | 4119480 | 1/1993 |
| DE | 4242415 | 2/1994 |
| DE | 4401653 | 10/1995 |
| DE | 4427406 | 10/1995 |
| EP | 0025399 | 3/1983 |
| EP | 0284532 | 9/1988 |
| EP | 0302356 | 2/1989 |
| EP | 0366571 | 5/1990 |
| EP | 0384850 | 8/1990 |
| EP | 0442245 | 8/1991 |
| EP | 0537075 | 4/1993 |
| EP | 0580415 | 1/1994 |
| EP | 0 609 049 | 8/1994 |
| EP | 0639488 | 2/1995 |
| EP | 0775653 | 5/1997 |
| EP | 1095880 | 2/2001 |
| FR | 1469877 | 2/1967 |
| FR | 2284481 | 4/1976 |
| FR | 2394423 | 1/1979 |
| FR | 2652340 | 9/1989 |
| FR | 2672578 | 8/1992 |
| FR | 2689845 | 10/1993 |
| FR | 2736336 | 1/1997 |
| IT | 526008 | 5/1955 |
| JP | 60036230 | 2/1985 |
| NL | 157253 | 6/1968 |
| SU | 1036593 | 8/1983 |
| WO | 95/18029 | 7/1995 |
| WO | 96/12665 | 5/1996 |
| WO | 97/02201 | 1/1997 |
| WO | 97/44220 | 11/1997 |
| WO | 97/49627 | 12/1997 |
| WO | 2004078618 | 9/2004 |
| WO | 2009014815 | 1/2009 |

OTHER PUBLICATIONS

International Searching Authority, "PCT Written Opinion of the International Searching Authority," issued in connection with counterpart PCT application No. PCT/US2008/065855, mailed on Dec. 3, 2008, 8 pages.

International Bureau, "International Preliminary Report on Patentability," issued in connection with counterpart international application serial No. PCT/US2008/065855, issued Jan. 26, 2010, 9 pages.

Photographs of Combar Wheel-Restraint Product, taken in Nov. 1991 (2 pages).

Dyna Seal B.V., Brochure of Load and Unload Safely with the Dyna Seal Wheelblocker, Jan. 1993 (8 pages—with 4 pages of the original brochure in Dutch language and 4 pages of the English language translation).

Photographs of Kelley Auto-Chock Installation at Ford Detroit Parts Facility, taken in Jun. 1991 (2 pages).

Kelley, Brochure of Kelley Auto Chock Truck Restraint, Jan. 1991 (2 pages).

Pentalift, Inc., Drawings of Proposed Penta-Chock Installation for Coca-Cola, Mar. 6, 1991 (2 pages).

Super Seal Mfg. Ltd., Super Seal Dock Seals Catalog 11160/SU, received by the United States Patent and Trademark Office on Aug. 29, 1989 (8 pages).

Photograph of Wheel Restraint installed at Unilever near Moscow, Russia, Installation observed and Photograph taken on Mar. 1, 2007 (1 page).

European Patent Office, "Office Communication," issued in connection with European application serial No. 08 770 160.3, issued Jul. 1, 2010, 3 pages.

United States Patent and Trademark Office, "Non-Final Office Action," issued in connection with U.S. Appl. No. 12/833,697, mailed Nov. 15, 2010, 18 pages.

Photographs of Combar Wheel-Restraint Product, taken Nov. 1991, 2 pages.

Photographs of Kelley Auto-Check Installation at Ford Detroit Parts Facility, taken Jun. 1991, 2 pages.

Photograph of Wheel Restraint installed at Unilever near Moscow, Russia, Installation observed and photographed Mar. 1, 2007, 1 page.

United States Patent and Trademark Office, "Final Office Action," issued in connection with U.S. Appl. No. 12/833,697, mailed Jul. 29, 2011, 11 pages.

Canadian Intellectual Property Office, "Office Action," issued in connection with Canadian application serial No. 2,693,477, issued Oct. 5, 2011, 3 pages.

European Patent Office, "European Search Report," issued in connection with European application serial No. 11005605.8, mailed Nov. 15, 2011, 8 pages.

United States Patent and Trademark Office, "Notice of Allowance," issued in connection with U.S. Appl. No. 12/833,697, mailed Jun. 11, 2012, 11 pages.

United States Patent and Trademark Office, "Non-Final Office Action," issued in connection with U.S. Appl. No. 12/833,697, mailed Feb. 27, 2012, 14 pages.

Australian Governement IP Australia, "Examination Report," issued in connection with Australian application serial No. 2011203498, issued Aug. 10, 2012, 8 pages.

Canadian Intellectual Property Office, "Office Action," issued in connection with Canadian application serial No. 2,693,477, issued Jul. 4, 2012, 2 pages.

\* cited by examiner

FIG. 13
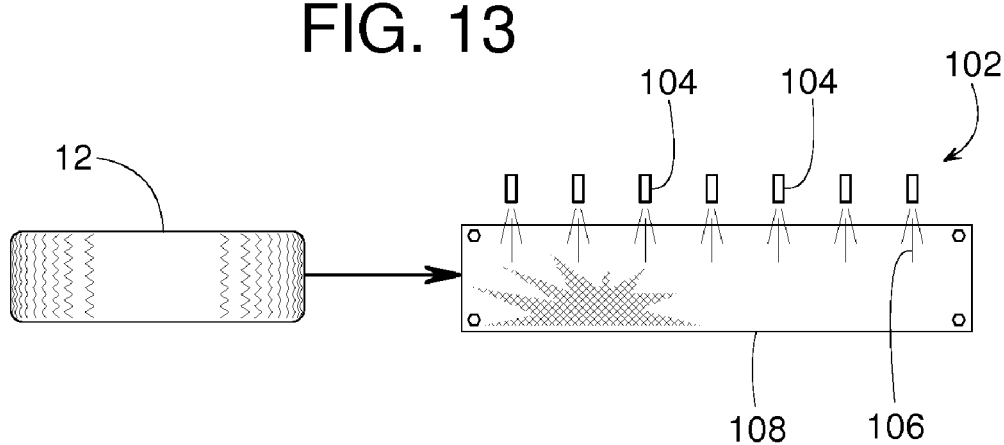
FIG. 14
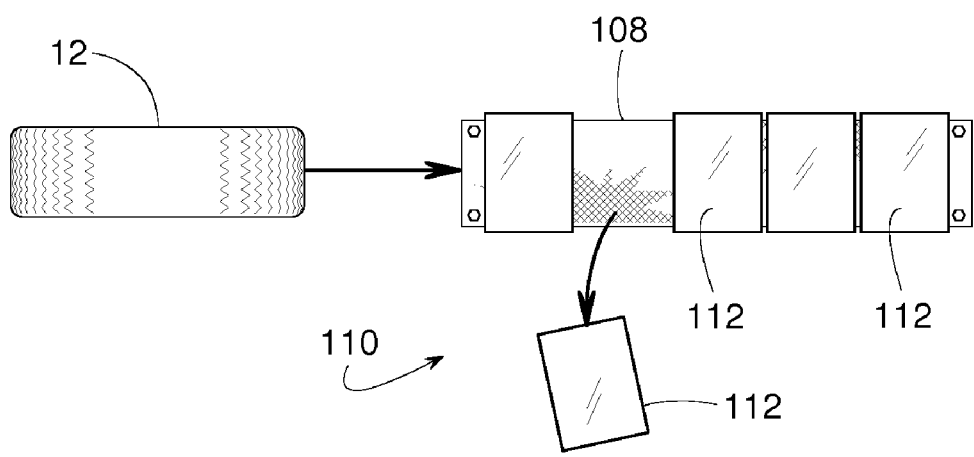
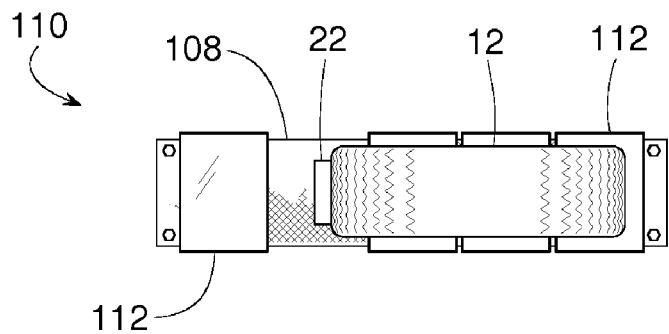
FIG. 15

WHEEL CHOCK SYSTEM

FIELD OF THE DISCLOSURE

The present disclosure generally pertains to restraining a vehicle at a loading dock and more specifically to a wheel chock system.

BACKGROUND OF RELATED ART

When a truck, trailer or some other vehicle is parked at a loading dock, often some sort of vehicle restraint is used to keep the truck from inadvertently moving away from an elevated platform of the dock. This allows a forklift truck to safely drive between the dock platform and the truck for the purpose of loading or unloading the cargo inside the truck.

There are a variety of vehicle restraints available that can be installed at a loading dock for engaging the truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel restraint can be used for blocking one or more of the truck's wheels.

Perhaps the most common wheel restraint is simply a wheel chock that wedges between the driveway and the underside of the wheel. However, wheel chocks often slip out of position on driveways that are slippery due to oil, rain, ice, sand, gravel or dirt. Moreover, wheel chocks usually are loose items that do not permanently attach to the loading dock area, so they often get misplaced.

One solution to these problems is disclosed in U.S. Pat. No. 7,032,720, which shows a wheel chock that is coupled to the loading dock by way of an articulated arm. To help prevent the chock from slipping out of its wheel-blocking position, the chock can be placed in mating engagement upon a serrated base plate that is anchored to the driveway. Although such a system can be effective, it does have some drawbacks.

First, a counterweight spring on the arm tends to prevent the wheel chock from resting its full weight upon the base plate. Second, the length to which the arm must extend to reach the wheel can adversely affect the angular relationship (about a vertical axis) between the mating surfaces of the chock and base plate. Third, although the '720 device includes a sensor for detecting the presence of a wheel, the sensor does not indicate whether the chock is fully engaged with the serrations of the base plate. And fourth, dirt, ice and other contaminants could hinder the engagement between the chock and the base plate, thus reducing the effectiveness of the chock.

Consequently, a need exists for a wheel chock system that overcomes the limitations and drawbacks of current systems.

SUMMARY

In some embodiments, a wheel chock for restraining a vehicle at a loading dock is supported by a spring loaded articulated arm, wherein the spring force can be released.

In some embodiments, a wheel chock is supported by an articulated arm that includes a pivotal joint where the arm connects to the chock, wherein the joint permits the chock to rotate relative to the arm about a vertical axis.

In some embodiments, a wheel chock includes a sensor that detects whether the chock is fully engaged with a lower support surface.

In some embodiments, a manually manipulated wheel chock is coupled to a hydraulic cylinder that can forcibly draw the chock against a vehicle's wheel.

In some embodiments, a wheel chock can be manually placed upon a mating base plate, and a hydraulic cylinder can move the plate to force the chock against a vehicle's wheel.

In some embodiments, a set of hooks or latches selectively engage and release a wheel chock from a lower support surface that is anchored to the ground. In some embodiments, a manually operated wheel chock includes a cleaning system that inhibits debris, ice and other contaminants from accumulating on a surface upon which the chock is placed.

BRIEF DESCRIPTION OF THE DRAWINGS

FIG. 13 is a top view similar to FIG. 10 but showing an alternate embodiment of a cleaning system.

FIG. 14 is a top view similar to FIG. 13 but showing yet another embodiment.

FIG. 15 is a top view similar to FIG. 14 but showing the wheel restraint system in a holding position.

DETAILED DESCRIPTION

Figure 1:
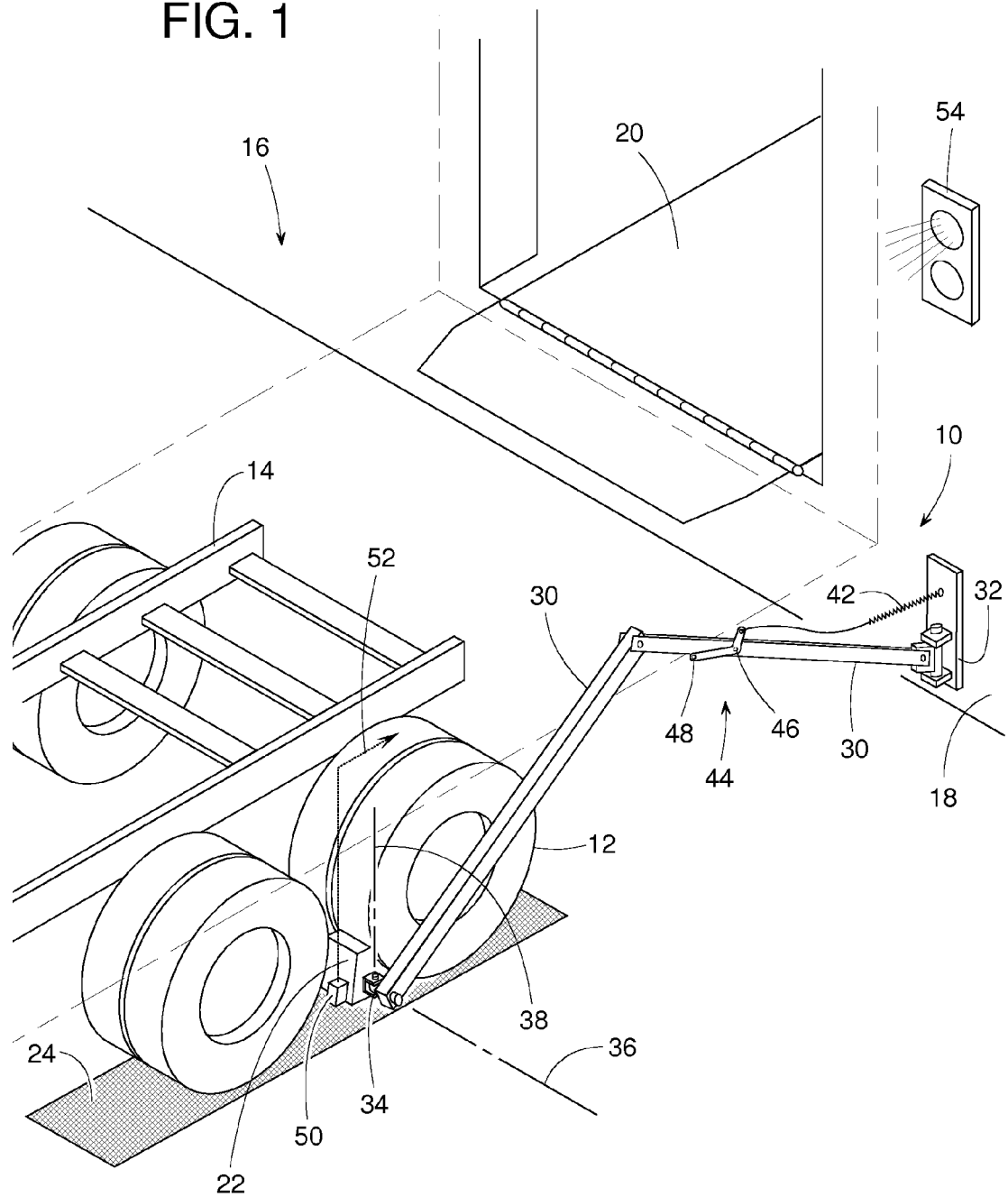
FIG. 1 is a perspective view a wheel restraint in a holding position.
Figure 2:
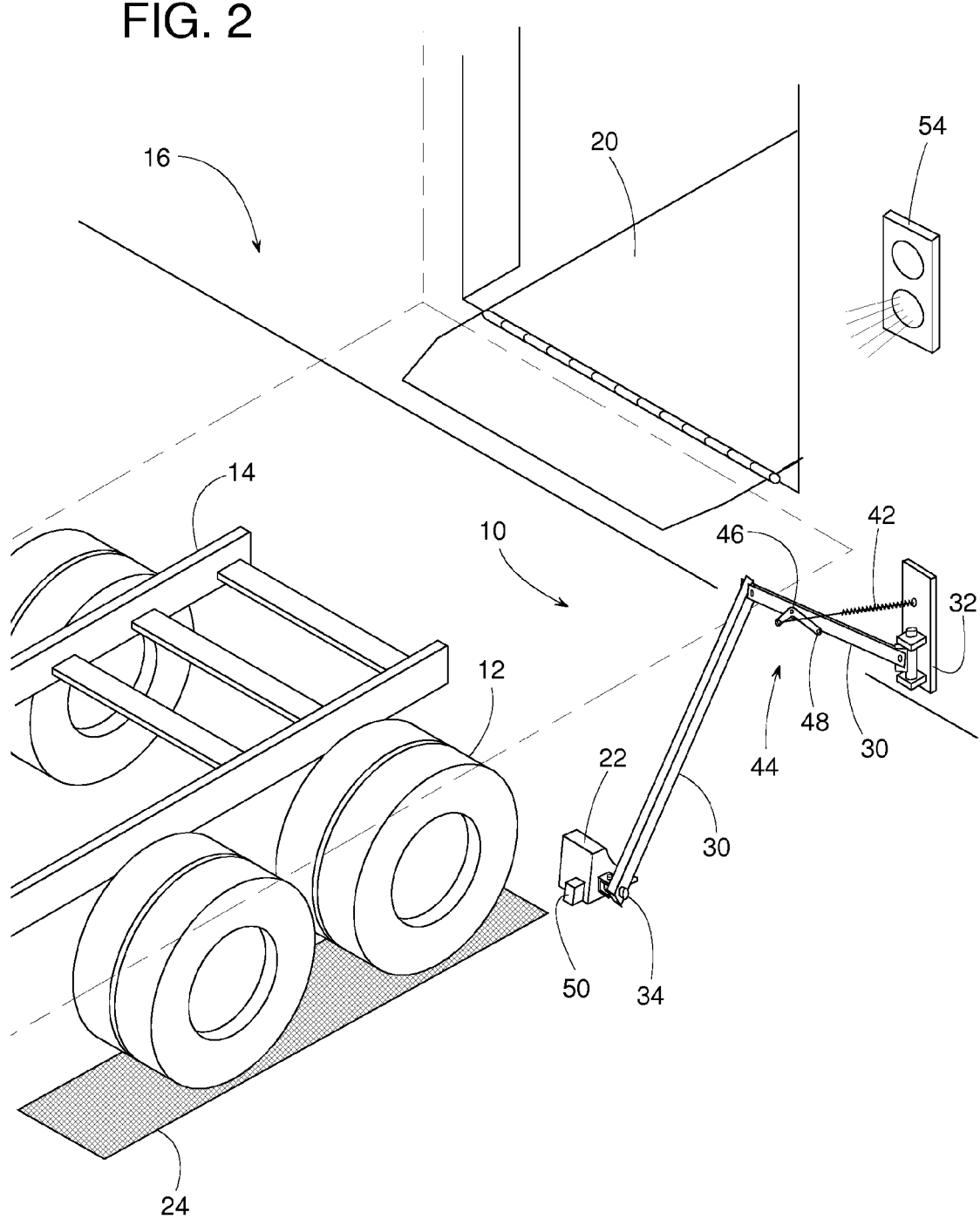
FIG. 2 is a perspective view of the wheel restraint of FIG. 1 but showing the restraint in a release position.

FIGS. 1 and 2 show a wheel restraint system 10 for restraining at least one wheel 12 of a vehicle 14 at a loading dock 16. Restraint 10 is shown in a holding position in FIG. 1 and is shown in a release position in FIG. 2. In the holding position, restraint 10 helps hold vehicle 14 adjacent to a dock face 18 so that cargo can be safely conveyed on and off of vehicle 14. In some cases, a conventional dock leveler 20 can be used to facilitate the loading and unloading operations. An upper section of vehicle 14 is shown in phantom lines to more clearly show the subject invention.

Figure 3:
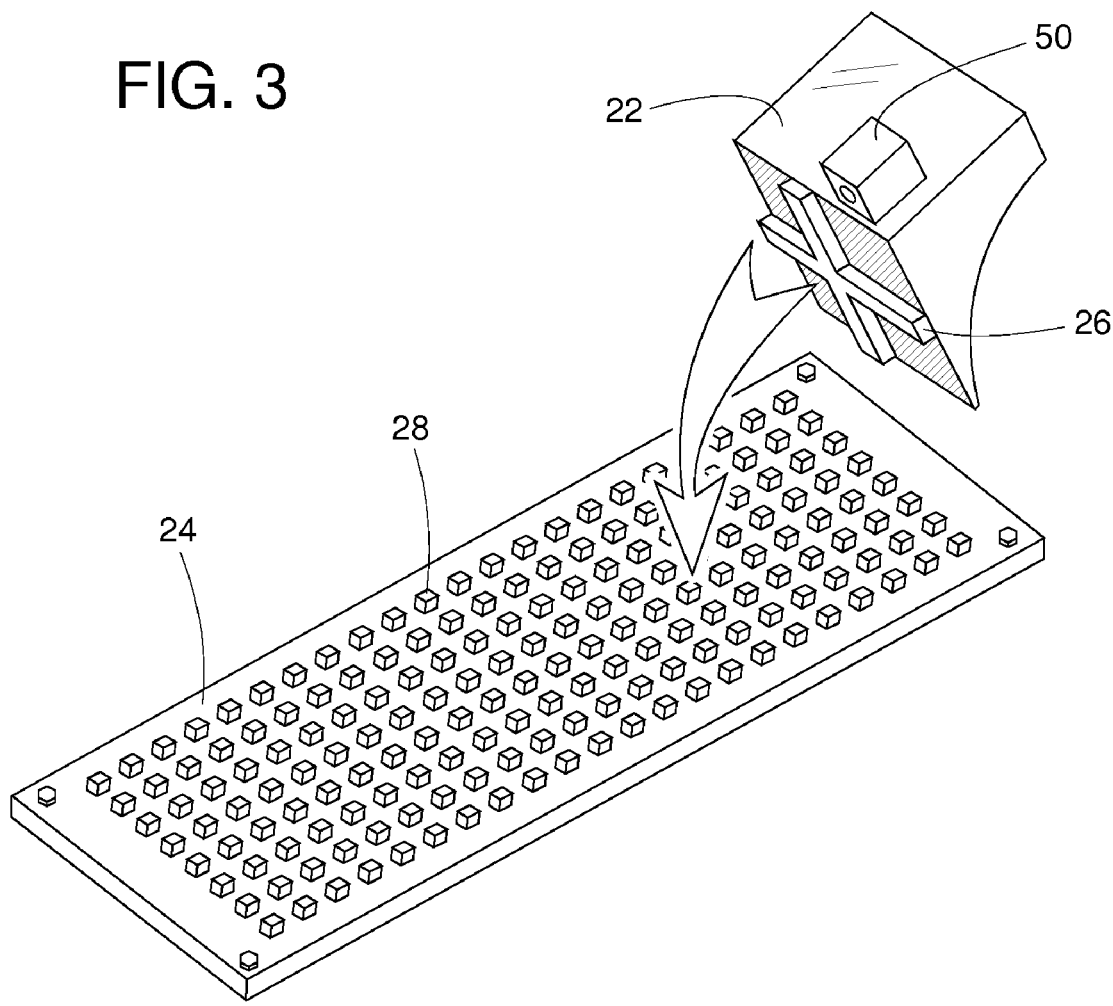
FIG. 3 is a perspective view of a wheel chock being lowered upon a mating base.
Figure 4:
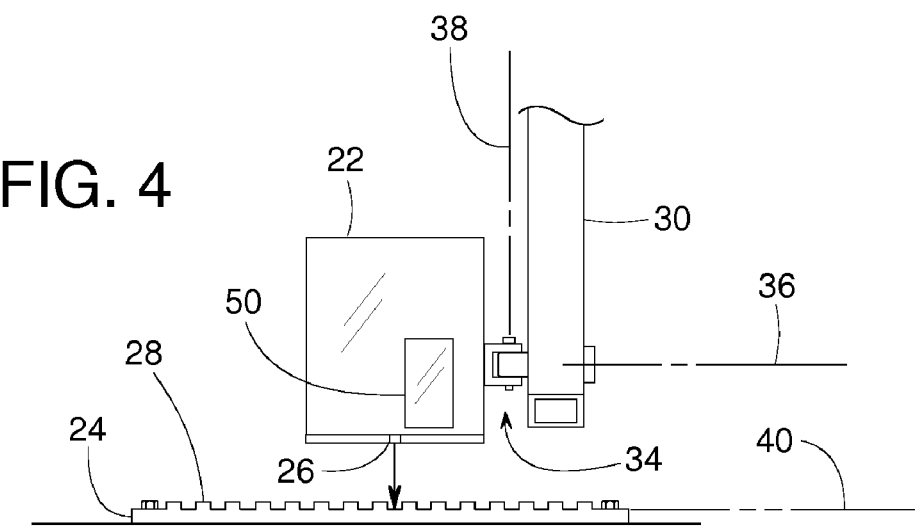
FIG. 4 is an end view looking toward the dock face and showing a wheel chock being lowered upon a base.

Wheel restraint 10 includes a wheel chock 22 that may, for example, rest upon a base 24 (lower support surface) when restraint 10 is in the holding position of FIG. 1. To limit the wheel chock's horizontal movement (particularly in a forward direction away from dock face 18) base 24 and/or chock 22 may include an interlocking feature such as a tooth 26 or 28 that engages a mating feature in the opposing surface, as shown in FIGS. 3 and 4. The various shapes, sizes, quantities and positions of tooth 26 and 28 are too numerous to mention, and it will be appreciated by those of ordinary skill in the art that the number of possible designs is unlimited.

To assist the repositioning of chock 22 between the holding and release positions, an elevated articulated arm 30 couples chock 22 to an anchor 32 that is attached to dock 16. Various joints of arm 30, anchor 32 and/or chock 22 enable chock 22 to be moved in three-dimensional space. To ensure that chock 22 can rest flat upon base 24, a joint 34 coupling arm 30 to chock 22, as shown in FIG. 4, permits chock 22 to rotate about a substantially horizontal axis 36 that is substantially parallel to dock face 18. To ensure the horizontal footprint of chock 22 can lie square to base 24 regardless of the chock's distance from dock face 18, joint 34 also allows chock 22 to rotate about a second axis 38 that is perpendicular to or at least traverses an imaginary horizontal plane 40. Joint 34 could be any multi-axis joint including, but not limited to, a universal ball joint.

To further assist the manual repositioning of chock 22, a spring 42 coupled to arm 30 helps offset the weight of chock 22 and arm 30. Counteracting the weight of arm 30 and chock 22 can be helpful while positioning chock 22; however, counteracting that weight is not always desired. The weight of arm 30 and chock 22, for instance, can actually be useful in holding chock 22 solidly against base 24. Thus, a spring release device 44 might be added so that spring 42 can be selectively stressed (FIG. 2) and released (FIG. 1). In the relaxed position of FIG. 1, the stress in spring 42 is reduced but does not necessarily have to be reduced to zero. In some examples, device 44 is a lever that can be toggled over center by rotating the lever about a pivot point 46. To limit the rotation of the lever, an end stop 48 on device 44 engages arm 30.

When chock 22 is in the holding position of FIG. 1, a sensor 50 mounted to chock 22 can be used determine whether chock 22 is actually fully engaged with base 24. Sensor 50 can be any device that can provide a signal 52 in response to proper engagement between chock 22 and base 24. Examples of sensor 50 include, but are not limited to, a proximity switch (e.g., Hall effect sensor), electromechanical switch, photoelectric eye, etc. Signal 52 can be transmitted via wires through arm 30 or can be transmitted wirelessly to control one or more signal lights 54.

Figure 5:
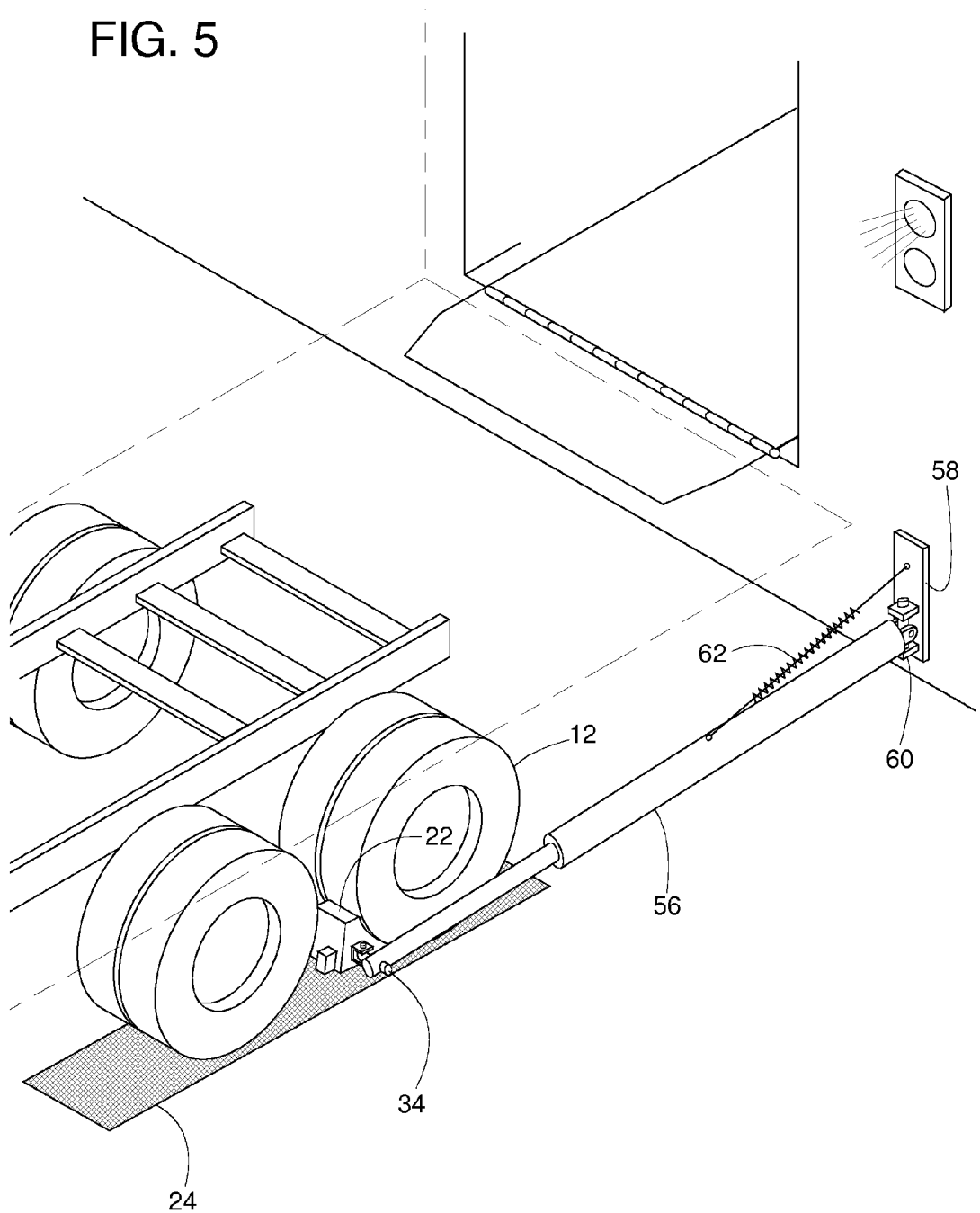
FIG. 5 is a perspective view similar to FIG. 1 but showing another embodiment.

FIG. 5 shows another example wherein a hydraulic cylinder 56 (hydraulic arm) replaces articulated arm 30. By controlling or stopping the flow of hydraulic fluid using conventional techniques, cylinder 56 can help hold wheel chock 22 at its holding position, as shown in FIG. 5. An anchor 58 with a pivotal joint 60 allows repositioning of cylinder 56 and chock 22. Similar to spring 42 of wheel restraint 10, a spring 62 can be used to help offset the weight of cylinder 56 and chock 22.

Figure 6:
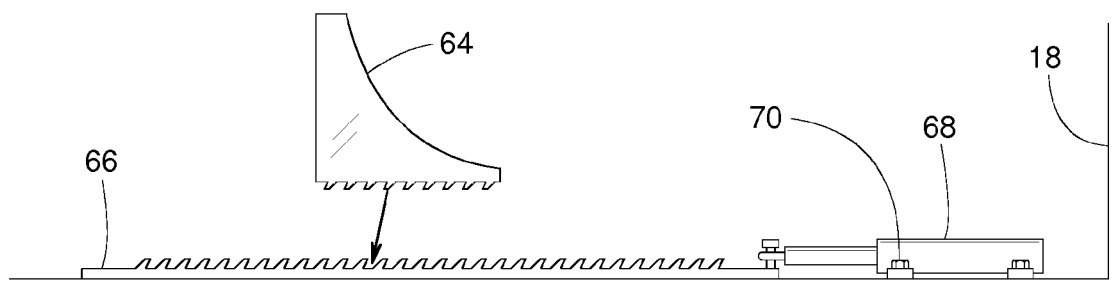
FIG. 6 is a side view of a wheel chock in a release position.
Figure 7:
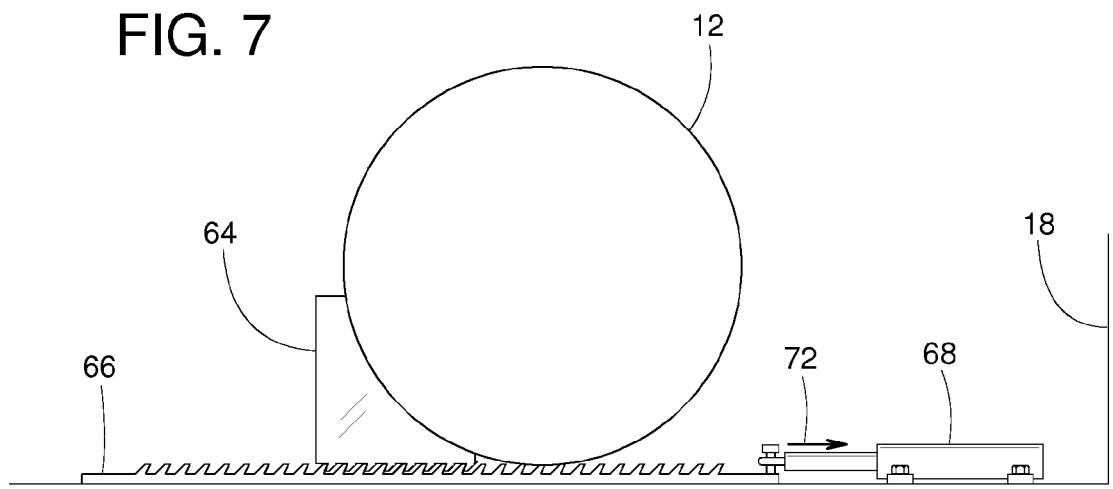
FIG. 7 is a side view similar to FIG. 6 but showing the chock in a holding position.

FIGS. 6 and 7 show a wheel chock 64 and a sliding base 66 with an alternate tooth design. This wheel restraint system includes a linear actuator 68 (e.g., a hydraulic cylinder, lead screw, etc.) that is held in place by an anchor 70 fixed to the loading dock. Actuator 68 can draw chock 64 tightly up against wheel 12 by pulling base 66 towards dock face 18, as indicated by arrow 72. To release wheel 12, actuator 68 extends to push base 66 and chock 64 away from dock face 18. Once chock 64 is no longer tightly up against wheel 12, chock 64 can be manually lifted from base 66. The mechanism for maintaining the chock in position shown in FIGS. 6 and 7 could be used with a manual chock, or one connected to a mechanism for facilitating chock placement such as that shown in FIGS. 1 and 2. The same holds true for the remaining examples or concepts described herein.

Figure 8:
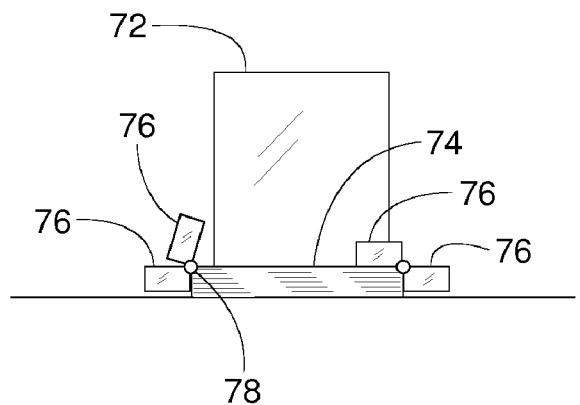
FIG. 8 is an end view similar to FIG. 4 but showing another embodiment.
Figure 9:
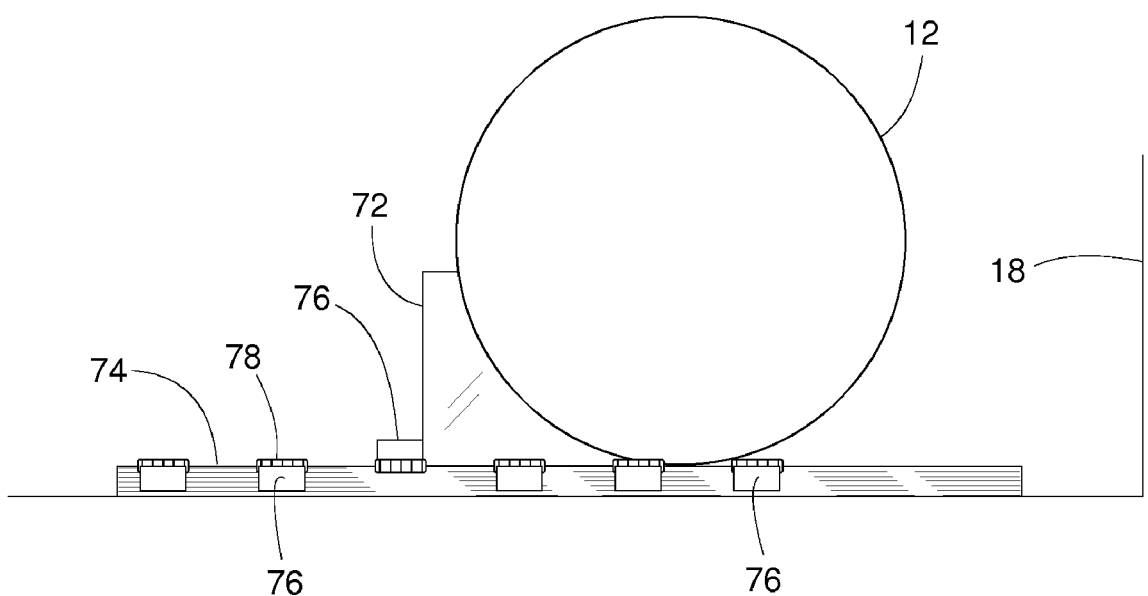
FIG. 9 is a side view similar to FIG. 7 but showing the wheel chock of FIG. 8.

FIGS. 8 and 9 show a wheel chock 72 resting upon a stationary base 74. To limit the chock's movement away from dock face 18, one or more hooks or latches 76 are pivotally connected to chock 72 or base 74. For the illustrated example, a hinge 78 connects each latch 76 to base 74 such that selected latches 76 can be pivoted upward to limit the movement of chock 72. Although it is generally more important to limit the chock's movement away from dock face 18, latches 76 and their mounting configuration to base 74 or chock 72 could be such that latches 76 restrict the chock's movement in other directions as well.

Figure 10:
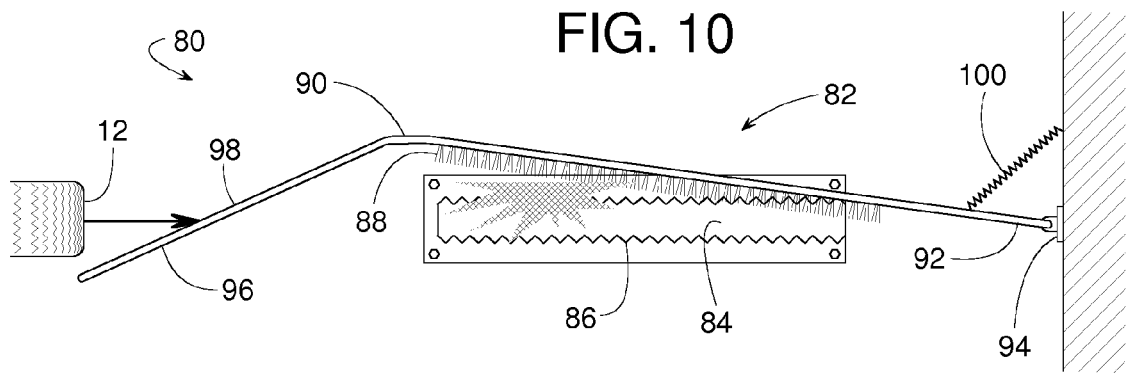
FIG. 10 is a top view of a cleaning system for the base of a wheel restraint system.
Figure 11:
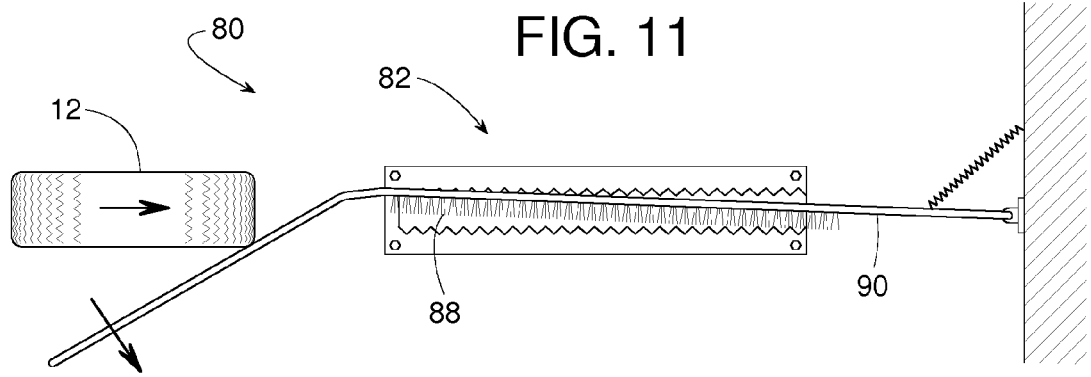
FIG. 11 is a top view similar to FIG. 10 but showing a brush sweeping across the base.
Figure 12:
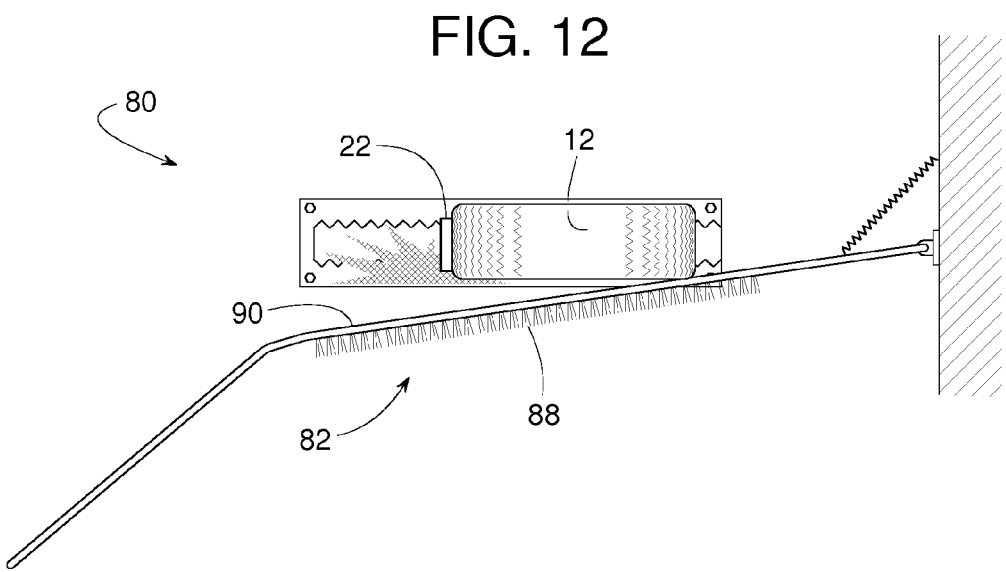
FIG. 12 is a top view similar to FIGS. 10 and 11 but showing the wheel restraint system in a holding position.

FIGS. 10, 11 and 12 show a wheel chock system 80 that includes a cleaning system 82 for inhibiting contaminants, such as dirt and ice, from accumulating on a base 84. To prevent ice from accumulating, a heating element 86, such as electrical resistive wire or some other heat-generating source, is installed in proximity (i.e., in heat exchange relationship) with base 84.

A brush 88 mounted to a movable arm 90 can be used to sweep dirt from base 84. One end 92 of arm 90 is pivotally coupled to an anchor 94. An opposite end 96 of arm 90 provides a cam surface 98 against which wheel 12 can push so that as a vehicle backs into the loading dock, the engagement of wheel 12 against cam surface 98 forces brush 88 to sweep across base 84. When the vehicle departs, a spring 100 can be used to pull arm 90 back to its position of FIG. 10. Alternatively, arm 90 could be power actuated. A linearly movable brush is also well within the scope of the invention.

FIG. 13 shows an alternative cleaning system 102 that includes one or more nozzles 104 that discharges a fluid 106 (e.g., air, water or an ice-thawing liquid) to clear contaminants from a base 108 or some other lower support surface. Fluid discharge can be triggered manually, or it can be triggered automatically in response to a timer or a sensor responsive to a vehicle or the presence of a contaminant.

FIGS. 14 and 15 show a cleaning system 110 wherein one or more covers 112 help shelter unused portions of base 108. For the illustrated example, covers 112 are moved manually by simply lifting the covers on or off of base 108. Alternatively, covers 112 can be hinged to base 108 so that covers 112 can be pivoted on and off.

Although the invention is described with respect to various examples, modifications thereto will be apparent to those of ordinary skill in the art. Many of the wheel restraint features disclosed herein are interchangeable among the various examples. The scope of the invention, therefore, is to be determined by reference to the following claims:

The invention claimed is:

1. A wheel restraint system to engage a wheel of a vehicle at a loading dock, the wheel restraint system comprising:
   an anchor mountable to the loading dock;
   a wheel chock movable to a holding position and a release position such that in the holding position, the wheel chock is to obstruct the wheel, and in the release position, the wheel chock is clear of the wheel;
   an arm to couple the wheel chock to the anchor;
   a spring coupled to the arm; and
   a spring release device to couple the spring to the arm, the spring release device, when activated, to move relative to the arm between a first position to stress the spring when the wheel chock is in the release position and, when deactivated, a second position to relax the spring when the wheel chock is in the holding position, the spring is to support more of the weight of the wheel chock when the spring release is in the first position to stress the spring than when the spring release is in the second position to relax the spring.

2. The wheel restraint system of claim 1, wherein the arm extends to an elevation that is higher than the wheel chock.

3. The wheel restraint system of claim 1, wherein the arm is articulated.

4. The wheel restraint system of claim 1, further comprising a base that is underneath and engaging the wheel chock when the wheel chock is in the holding position but is separated from the wheel chock when the wheel chock is in the release position.

5. A wheel restraint system of claim 1, further comprising a lower support surface the wheel chock is to rest upon and engage the lower support surface and a sensor carried by the wheel chock and being responsive to the position of the wheel chock relative to the lower support surface, the sensor to provide a signal to confirm that the wheel chock is resting upon and engaging the lower support surface.

6. The wheel restraint system of claim 5, wherein the lower support surface includes a base that meshes with the wheel chock.

7. The wheel restraint system of claim 6, further comprising a tooth protruding from at least one of the wheel chock and the base, wherein the tooth helps maintain engagement between the wheel chock and the base.

8. A wheel restraint system to engage a wheel of a vehicle at a loading dock that includes a dock face, the wheel restraint system comprising:

an anchor mountable to the loading dock;

a wheel chock movable to a holding position and a release position such that in the holding position, the wheel chock obstructs the wheel, and in the release position, the wheel chock is clear of the wheel;

an arm coupled to the anchor via a first joint, the first joint to enable the arm to rotate relative to the anchor about a first axis and a second axis, the first axis being perpendicular to the second axis; and a second joint coupling the arm to the wheel chock such that the second joint enables:
  a) relative rotation between the wheel chock and the arm about a substantially horizontal axis that is substantially parallel to the dock face, and
  b) relative rotation between the wheel chock and the arm about a third axis that traverses a horizontal plane perpendicular to the dock face; and a spring release device coupled to the arm to assist with manual repositioning of the chock.

9. The wheel restraint system of claim 8, wherein the third axis is substantially vertical.

10. The wheel restraint system of claim 8, wherein the arm extends to an elevation that is higher than the wheel chock.

11. The wheel restraint system of claim 8, wherein the arm is articulated.

12. The wheel restraint system of claim 8, further comprising a base that is underneath and engaging the wheel chock when the wheel chock is in the holding position but is separated from the wheel chock when the wheel chock is in the release position.

\* \* \* \* \*